(12) United States Patent
Mimura

(10) Patent No.: US 9,311,950 B2
(45) Date of Patent: Apr. 12, 2016

(54) OPTICAL DISK APPARATUS, CONTROL METHOD, CONTROL PROGRAM AND INFORMATION STORAGE MEDIUM

(71) Applicant: Sony Computer Entertainment Inc., Tokyo (JP)

(72) Inventor: Satoshi Mimura, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/521,800

(22) Filed: Oct. 23, 2014

(65) Prior Publication Data

US 2015/0131421 A1    May 14, 2015

(30) Foreign Application Priority Data

Nov. 8, 2013  (JP) ................. 2013-232291

(51) Int. Cl.
  *G11B 7/00* (2006.01)
  *G11B 20/18* (2006.01)
  (Continued)

(52) U.S. Cl.
  CPC .............. *G11B 7/005* (2013.01); *G11B 7/0945* (2013.01); *G11B 7/08511* (2013.01); *G11B 7/1275* (2013.01); *G11B 19/12* (2013.01); *G11B 2007/0006* (2013.01); *G11B 2007/0013* (2013.01); *G11B 2220/232* (2013.01); *G11B2220/2545* (2013.01); *G11B 2220/2562* (2013.01); *G11B 2220/2579* (2013.01)

(58) Field of Classification Search
  USPC .......... 369/13.24–13.28, 13.39, 30.21–30.28, 369/30.36, 30.24, 44.25, 44.27, 44.32, 369/47.14, 47.17, 47.44, 47.46, 47.5, 47.53, 369/47.55, 53.12, 53.15, 53.16, 53.22, 369/53.27, 5, 3.33–53.37, 53.42, 53.44, 369/53.45
  See application file for complete search history.

(56) References Cited

U.S. PATENT DOCUMENTS

| 7,746,747 B2 | 6/2010 | Hasegawa |
| 2005/0058036 A1* | 3/2005 | Chen ............... G11B 19/12 369/53.2 |

(Continued)

FOREIGN PATENT DOCUMENTS

| JP | 2007095144 A | 4/2007 |
| JP | 2008059692 A | 3/2008 |

(Continued)

OTHER PUBLICATIONS

Office Action for corresponding JP Patent Application No. 2013-232291, dated Sep. 29, 2015.

*Primary Examiner* — Dionne H Pendleton
(74) *Attorney, Agent, or Firm* — Matthew B. Dernier, Esq.

(57) ABSTRACT

Disclosed herein is an optical disc apparatus including: an optical pickup radiating light having a first wavelength provided for an optical disc medium of a first type and light having a second wavelength which is smaller than the first wavelength and provided for another optical disc medium of a second type; a signal outputting section outputting a signal according to light reflected by the optical disc medium to reflect light radiated by the optical pickup; and a type determination section requesting the optical pickup to radiate light having the first wavelength to an object optical disc medium to acquire the signal output by the signal outputting section and determining the type of the object optical disc medium in accordance with the number of peaks appearing in the acquired output signal output by the signal outputting section while moving the optical pickup in a direction to the object optical disc medium.

11 Claims, 7 Drawing Sheets

(51) Int. Cl.
*G11B 5/09* (2006.01)
*G11B 7/005* (2006.01)
*G11B 7/09* (2006.01)
G11B 19/12 (2006.01)
G11B 7/1275 (2012.01)
G11B 7/085 (2006.01)

(56) References Cited

U.S. PATENT DOCUMENTS

2005/0068873 A1* 3/2005 Chung ................ G11B 7/0945
  369/53.23
2005/0265187 A1* 12/2005 Chang ................ G11B 19/125
  369/53.2
2008/0080345 A1* 4/2008 Hasegawa .................... 369/53.2
2008/0298205 A1  12/2008 Arakawa
2009/0080305 A1*  3/2009 Lee ...................... G11B 19/127
  369/53.22
2010/0157763 A1*  6/2010 Verbeek et al. ........... 369/53.22

FOREIGN PATENT DOCUMENTS

| JP | 2008108406 A | 5/2008 |
| JP | 2008299960 A | 12/2008 |
| JP | 2009116999 A | 5/2009 |
| JP | 4769150 B2 | 9/2011 |

* cited by examiner

TO SIGNAL OUTPUTTING CIRCUIT 17

DISC OUTER-CIRCUMFERENCE DIRECTION

DISC OUTER-CIRCUMFERENCE DIRECTION

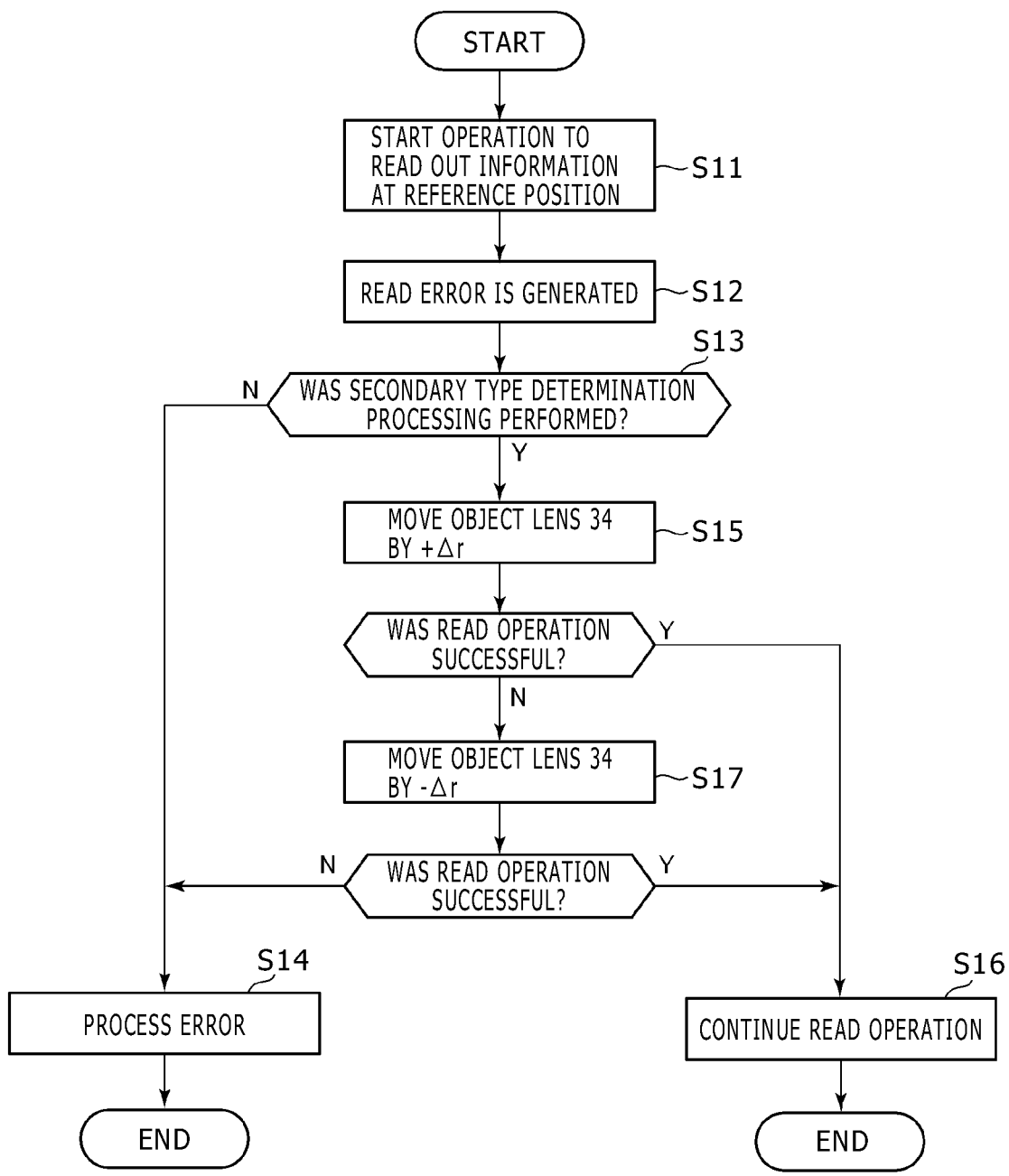

OPTICAL DISK APPARATUS, CONTROL METHOD, CONTROL PROGRAM AND INFORMATION STORAGE MEDIUM

BACKGROUND

The present technology relates to an optical disc apparatus for reading out information recorded on an optical disc medium, a control method of the optical disc apparatus, a control program of the optical disc apparatus and an information storage medium for storing the control program. Examples of the optical disc medium are a compact disc (CD), a digital versatile disc (DVD) and a Blue-ray Disc (registered trademark).

For example, optical disc media having a plurality of types such as a CD, a DVD, and a Blue-ray Disc (BD) are used as information storage media. For the optical disc media having a plurality of types, there is provided an optical disc apparatus capable of reading out information stored in the optical disc media. When an optical disc medium is newly set on such an optical disc apparatus, first of all, the optical disc apparatus determines the type of the optical disc medium set thereon and then reads out information from the medium by adoption of a read method according to the type (refer to a document such as Japanese Patent No. 4769150).

In general, the optical disc medium has a structure including a plurality of laminated layers such as a data recording layer used for recording information and a protection layer for protecting the data recording layer. In addition, there are differences in distance between the medium surface and the data recording layer (signal surface) among the types of the optical disc media. Thus, when the optical disc apparatus determines the type of the optical disc medium, while the optical disc apparatus is moving an optical pickup in a direction toward the optical disc medium, the optical disc apparatus radiates light to the optical disc medium and detects a medium-surface reflection signal reflected by the medium surface and a signal-surface reflection signal reflected by the signal surface. Then, the optical disc apparatus computes the distance from the medium surface to the signal surface on the basis of the position of the optical pickup when detecting the medium-surface reflection signal and the position of the optical pickup when detecting the signal-surface reflection signal. Finally, the optical disc apparatus is capable of determining the type of the optical disc medium from a result of the computation.

SUMMARY

When an optical disc apparatus is used for a long period of time, dirt of the air, cigarette tars and the like are stuck to the optical system, causing the light transmission factor to decrease. The signal level of the reflected light to be measured may decrease accordingly. When determining the type of the optical disc medium with a decreased light transmission factor, it is impossible to detect the medium-surface reflection signal having a relatively low signal level so that it is feared that the type determination ends in a failure. As a method for solving such a problem, for example, when detecting the medium-surface reflection signal, a threshold value used in peak detection is lowered. As an alternative, it is possible to conceive a method of amplifying the signal level by using an amplification circuit. With these methods, however, it is feared that electrical noises are mistakenly detected as a medium-surface reflection signal or a signal-surface reflection signal.

It is thus desirable to provide an optical disc apparatus capable of determining the type of an optical disc medium with a high degree of precision even for a low signal level, a control method of the optical disc apparatus, a control program for the optical disc apparatus and an information storage medium used for storing the control program.

An optical disc apparatus according to the present technology is an optical disc apparatus capable of reading out information stored in an optical disc medium of a first type and another optical disc medium of a second type. The optical disc apparatus includes an optical pickup radiating light having a first wavelength provided for the optical disc medium of the first type and light having a second wavelength which is smaller than the first wavelength and provided for the optical disc medium of the second type. The optical disc apparatus further includes a signal outputting section outputting an output signal according to reflected light obtained as a result of reflection on the optical disc medium of light radiated by the optical pickup. The optical disc apparatus still further includes a type determination section requesting the optical pickup to radiate light having the first wavelength to an object optical disc medium serving as an object of type determination to acquire an output signal output by the signal outputting section and determining the type of the object optical disc medium in accordance with the number of peaks appearing in the acquired output signal output by the signal outputting section while moving the optical pickup in a direction to the object optical disc medium.

A control method according to the present technology is a method of an optical disc apparatus which is capable of reading out information stored in an optical disc medium of a first type and another optical disc medium of a second type. The optical disc apparatus includes an optical pickup radiating light having a first wavelength provided for the optical disc medium of the first type and light having a second wavelength which is smaller than the first wavelength and provided for the optical disc medium of the second type. The optical disc apparatus further includes a signal outputting section outputting an output signal according to reflected light obtained as a result of reflection on the optical disc medium of light radiated by the optical pickup. The method includes requesting the optical pickup to radiate light having the first wavelength to an object optical disc medium serving as an object of type determination to acquire an output signal output by the signal outputting section while moving the optical pickup in a direction to the object optical disc medium. The method further includes determining the type of the object optical disc medium in accordance with the number of peaks appearing in the acquired output signal.

A program according to the present technology is a program for controlling an optical disc apparatus which is capable of reading out information stored in an optical disc medium of a first type and another optical disc medium of a second type. The optical disc apparatus includes an optical pickup radiating light having a first wavelength provided for the optical disc medium of the first type and light having a second wavelength which is smaller than the first wavelength and provided for the optical disc medium of the second type. The optical disc apparatus further includes a signal outputting section outputting an output signal according to reflected light obtained as a result of reflection on the optical disc medium of light radiated by the optical pickup. The program for a computer includes requesting the optical pickup to radiate light having the first wavelength to an object optical disc medium serving as an object of type determination to acquire an output signal output by the signal outputting section while moving the optical pickup in a direction to the object optical disc medium. The program further includes determining the type of the object optical disc medium in accordance with the number of peaks appearing in the acquired output signal.

An information storage medium according to the present technology is a medium which can be read by a computer and is used for storing a program for controlling an optical disc apparatus which is capable of reading out information stored in an optical disc medium of a first type and another optical disc medium of a second type. The optical disc apparatus includes an optical pickup radiating light having a first wavelength provided for the optical disc medium of the first type and light having a second wavelength which is smaller than the first wavelength and provided for the optical disc medium of the second type. The optical disc apparatus further includes a signal outputting section outputting an output signal according to reflected light obtained as a result of reflection on the optical disc medium of light radiated by the optical pickup. The program for the computer includes requesting the optical pickup to radiate light having the first wavelength to an object optical disc medium serving as an object of type determination to acquire an output signal output by the signal outputting section while moving the optical pickup in a direction to the object optical disc medium. The program further includes determining the type of the object optical disc medium in accordance with the number of peaks appearing in the acquired output signal.

BRIEF DESCRIPTION OF THE DRAWINGS

FIG. 10 is a flowchart showing typical flows of processing under optical-axis shift control.

DETAILED DESCRIPTION OF THE PREFERRED EMBODIMENT

The following description explains details of an embodiment of the present technology by referring to diagrams.

Figure 1:
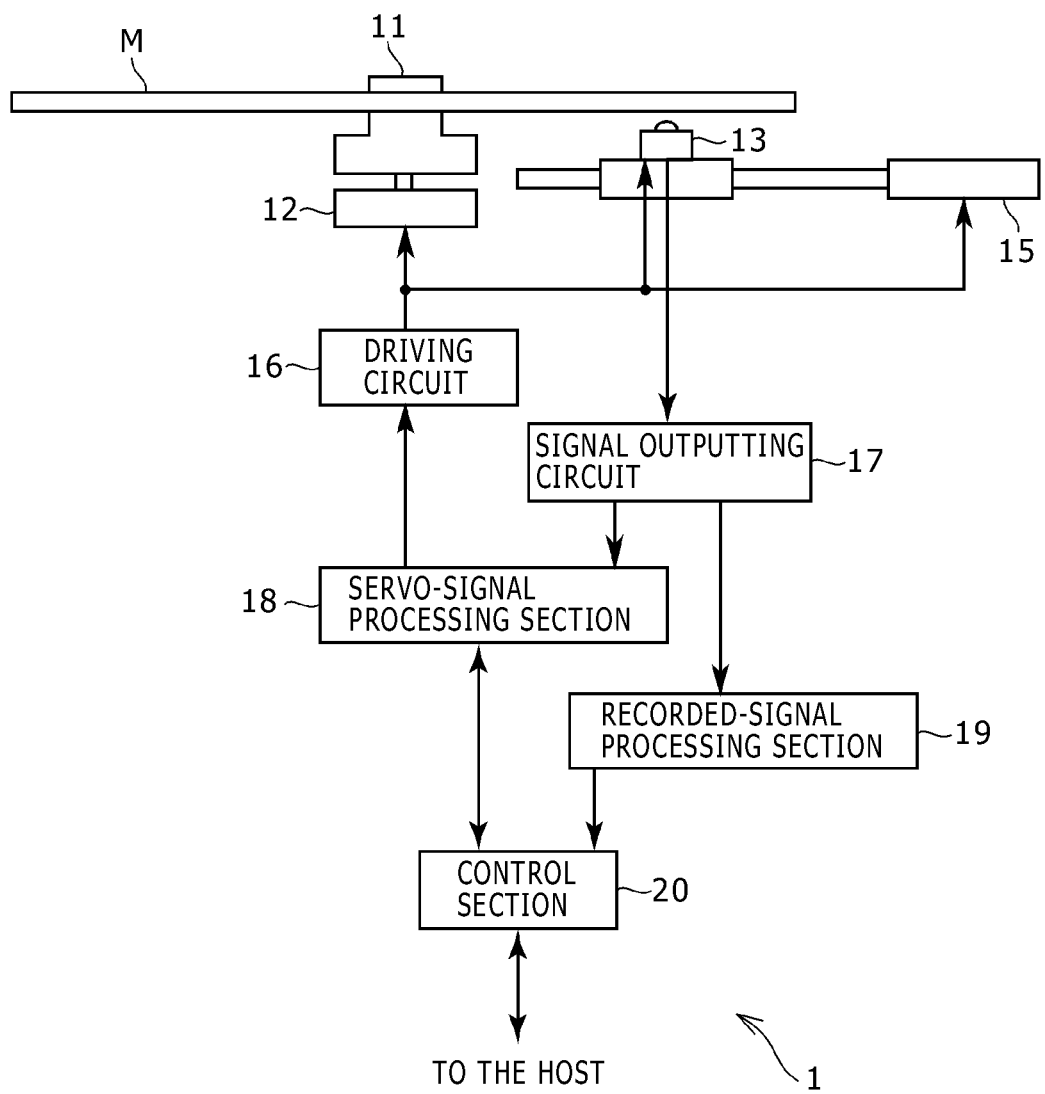
FIG. 1 is a block diagram showing a typical configuration of an optical disc apparatus according to an embodiment of the present technology.

An optical disc apparatus 1 according to an embodiment of the present technology is an optical disc apparatus for reading out information stored in an optical disc medium. As shown in FIG. 1, the optical disc apparatus 1 includes a medium support section 11, a spindle motor 12, an optical pickup 13, a feed motor 15, a driving circuit 16, a signal outputting circuit 17, a servo-signal processing section 18, a recorded-signal processing section 19 and a control section 20.

An optical disc medium M serving as the object of an information reading operation carried out by the optical disc apparatus 1 includes laminated layers such as a data recording layer for storing information and a protection layer for protecting the data recording layer on both sides. In the following description, the surface of the data recording layer is referred to as a signal surface. It is to be noted that the optical disc medium M may include a plurality of data recording layers. The optical disc apparatus 1 can also be configured to be capable of not only reading out information stored on the optical disc medium M, but also writing information onto the optical disc medium M. In addition, in the case of this embodiment, the optical disc apparatus 1 is configured to be capable of reading out information stored on the optical disc medium M of at least two types, that is, a CD and a BD.

The medium support section 11 supports the optical disc medium M in such a way that the optical disc medium M can be rotated. In addition, the medium support section 11 rotates the optical disc medium M by using power propagated from the spindle motor 12.

Figure 2:
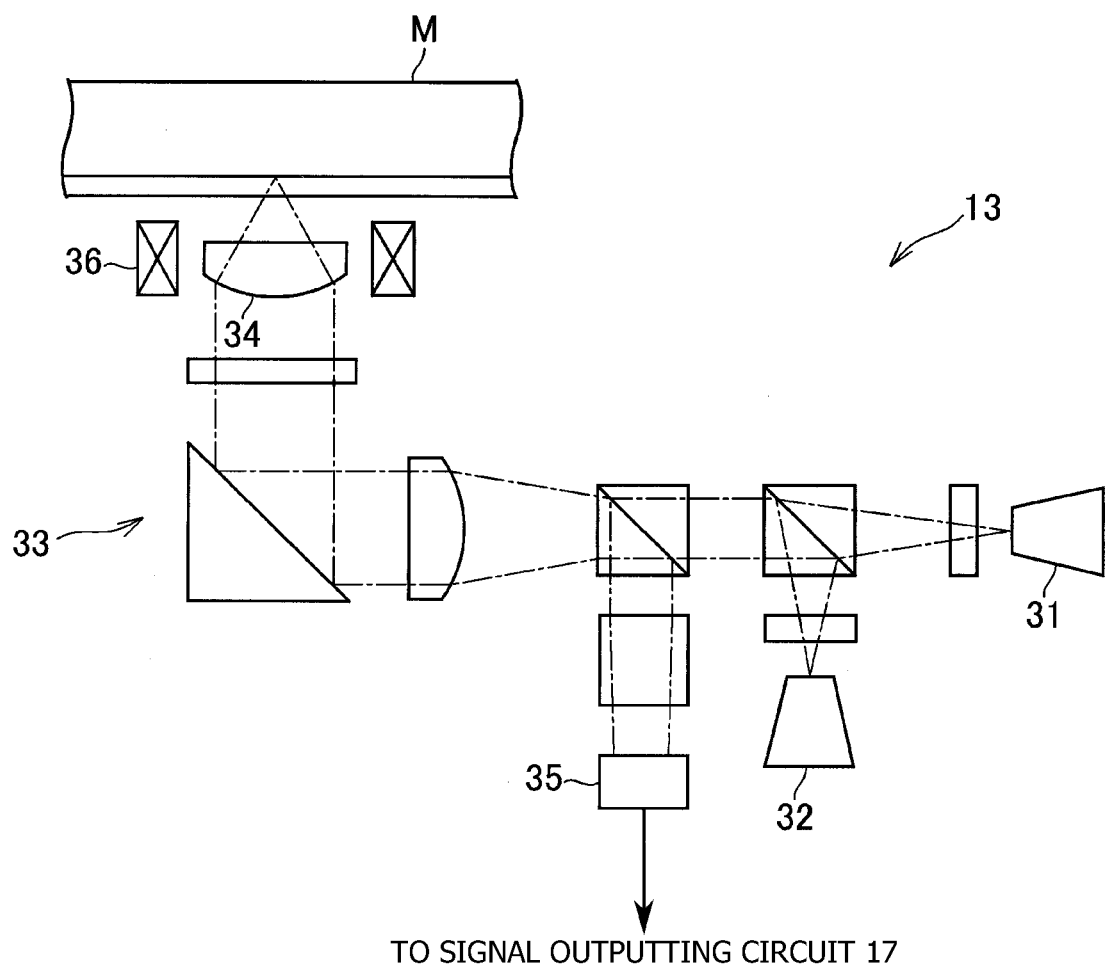
FIG. 2 is an outline diagram showing a typical internal configuration of an optical pickup employed in the optical disc apparatus according to an embodiment of the present technology.

The optical pickup 13 radiates laser light to the optical disc medium M and detects light reflected by the optical disc medium M in reflection of the radiated light, outputting a signal representing the reflected light detected thereby. Particularly, in the case of this embodiment, the optical pickup 13 is configured to be capable of radiating laser light having a plurality of wavelengths for optical disc media M of different types. FIG. 2 is an outline diagram showing a typical internal configuration of the optical pickup 13. The typical configuration shown in this figure includes a first light emitting device 31, a second light emitting device 32, an optical system 33, an object lens 34, a focus detector 35 and an object-lens driving section 36.

The first light emitting device 31 and the second light emitting device 32 are each a semiconductor laser device for outputting laser light. The first light emitting device 31 radiates light having a first wavelength for a CD whereas the second light emitting device 32 radiates light having a second wavelength for a BD. It is to be noted that the light having the first wavelength is the infrared light having a wavelength of 780 nm whereas the light having the second wavelength is the blue light having a wavelength of 405 nm which is smaller than the first wavelength. In the following description, for the sake of convenience, the light having the first wavelength is referred to as large-wavelength light whereas the light having the second wavelength is referred to as small-wavelength light.

The optical system 33 includes a plurality of optical components such as a polarized light beam splitter, a startup mirror and a multi lens. The optical pickup 13 includes an optical path for guiding light radiated by the first light emitting device 31 and the second light emitting device 32 to the object lens 34. In addition, the optical pickup 13 also includes another optical path for guiding reflected light to the focus detector 35 to be described later. The reflected light is light reflected by the optical disc medium M and transmitted through the object lens 34. The light radiated by the first light emitting device 31 and the second light emitting device 32 propagates to the object lens 34 by way of the optical system 33 and is converged by the object lens 34 before being radiated to the optical disc medium M.

After being transmitted through the object lens 34, the light reflected by the optical disc medium M is guided by the optical system 33 to the focus detector 35. The focus detector 35 includes a plurality of light receiving devices. When the light reflected by the optical disc medium M arrives at these light receiving devices, the focus detector 35 outputs a signal according to the strengths of the light received by the light receiving devices as an output signal.

The object-lens driving section 36 is configured to include an actuator and used to move the object lens 34 in the radial direction of the optical disc medium M and a direction perpendicular to the surface of the optical disc medium M. In the following direction, the radial direction is referred to as a tracking direction whereas the direction perpendicular to the surface of the optical disc medium M is referred to as a focus direction. With the object-lens driving section 36 moving the object lens 34 in the focus direction, it is possible to change the distance from the object lens 34 to the surface of the optical disc medium M.

The feed motor 15 moves the entire optical pickup 13 in the tracking direction. With the feed motor 15 driving the entire optical pickup 13 in this way, the optical pickup 13 can be moved from a position close to the center of the optical disc medium M to a position close to the outermost circumference of the optical disc medium M.

In accordance with a control signal received from the servo-signal processing section 18, the driving circuit 16 outputs driving signals for driving the spindle motor 12, the feed motor 15 and the object-lens driving section 36. In accordance with the driving signal received from the driving circuit 16, the rotational speed of the spindle motor 12 changes to control the rotational speed of the optical disc medium M. In addition, in accordance with the driving signal received from the driving circuit 16, the object-lens driving section 36 and the feed motor 15 are driven to control a distance between the object lens 34 and the medium rotational axis as well as a distance between the object lens 34 and the medium surface.

For example, the signal outputting circuit 17, the servo-signal processing section 18, the recorded-signal processing section 19 and the control section 20 are typically implemented by an analog circuit, an A/D converter, a digital signal processor (DSP) and a microcomputer. The analog circuit is a circuit for processing an analog signal output by the optical pickup 13. The A/D converter is a converter for converting an analog signal into a digital signal. The DSP is a processor for processing the digital signal.

On the basis of an analog signal output by the focus detector 35, the signal outputting circuit 17 outputs a variety of signals. To put it more concretely, the signal outputting circuit 17 carries out processing on an amplified signal obtained by amplifying a signal output by each light receiving device at a predetermined gain (amplification factor) in order to output signals including a focus-error signal (FE signal), a tracking-error signal (TE signal) and an RF signal for data reproduction. The focus-error signal is a signal representing a focus-direction shift between the signal surface of the optical disc medium M and the focal-point position of the object lens 34. The tracking-error signal is a signal representing a tracking-direction shift between the focal-point position of the object lens 34 and a track position of the optical disc medium M. In addition, the signal outputting circuit 17 also outputs a pull-in signal (PI signal) obtained by amplifying signals output by a plurality of light receiving devices and summing up the amplified signals.

On the basis of signals such as the PI signal, the FE signal and the TE signal which are output by the signal outputting circuit 17, the servo-signal processing section 18 generates a variety of signals for servo control and outputs the generated signals to the control section 20. In addition, in accordance with a command received from the control section 20, the servo-signal processing section 18 outputs control signals for driving the object-lens driving section 36, the feed motor 15 and the spindle motor 12 to the driving circuit 16.

In particular, the servo-signal processing section 18 carries out servo control in accordance with a command received from the control section 20. To put it more concretely, when a command to start the servo control is received from the control section 20, the servo-signal processing section 18 outputs a control signal for controlling the object-lens driving section 36 in accordance with the FE signal received from the signal outputting circuit 17 in order to carry out focus servo control for adjusting the position of the object lens 34 in the focus direction. It is thus possible to sustain a state in which the focus of the object lens 34 matches the signal surface of the optical disc medium M. In addition, the servo-signal processing section 18 outputs a control signal for controlling the object-lens driving section 36 in accordance with the TE signal received from the signal outputting circuit 17 in order to carry out tracking servo control for changing the position of the object lens 34 in the tracking direction. It is thus possible to drive the object lens 34 to make a movement relative to the medium surface so that the focus of the object lens 34 always follows a track in the data recording layer. In this way, the servo-signal processing section 18 carries out servo control to control the position of the object lens 34 relative to the surface of the optical disc medium M. It is thus possible to sustain a state in which the optical pickup 13 is capable of reading out information from the optical disc medium M so that, in this state, information is read out.

On the basis of an RF signal output by the signal outputting circuit 17, the recorded-signal processing section 19 demodulates a digital signal representing information recorded on the optical disc medium M and outputs the result of the demodulation to the control section 20. In addition, the recorded-signal processing section 19 also computes evaluation values (such as an RF amplitude and a jitter value) of precision to read out information from the optical disc medium M by using the optical pickup 13 and outputs the evaluation values to the control section 20.

The control section 20 is typically configured to have a microcomputer and includes an execution module as well as a storage device. The storage device employed in the control section 20 is used for storing programs to be executed and a variety of parameters. The execution module employed in the control section 20 carries out processing in accordance with the programs stored in the storage device. To put it more concretely, the control section 20 determines the type of an optical disc medium M set in the optical disc apparatus 1.

In addition, the control section 20 is connected to a host such as a personal computer, a home game machine unit or a video decoder. In accordance with a request made by the host, the control section 20 outputs instructions for driving the feed motor 15 and the object-lens driving section 36 to the servo-signal processing section 18 in order to move the focal point of the object lens 34 to a desired position on the optical disc medium M (the focal point of the object lens 34 is a position at which information is read out from the optical disc medium M). In addition, the control section 20 also outputs an instruction for changing the rotational speed of the spindle motor 12 to the servo-signal processing section 18 in order to adjust the rotational speed of the optical disc medium M. Then, in this state, the control section 20 outputs a modulated signal to the host. The modulated signal is a signal generated by the recorded-signal processing section 19 as a result of demodulation of a signal read out from the optical disc medium M.

Processing to Determine the Type of Optical Disc Medium

The following description explains a concrete example of processing carried out by the optical disc apparatus 1 according to this embodiment to determine the type of an optical disc medium M. The processing to determine the type of an optical disc medium M is carried out by the optical disc apparatus 1 for example when the optical disc medium M is newly set on the optical disc apparatus 1 or when the power supply of the optical disc apparatus 1 is turned on. In addition, this processing to determine the type of an optical disc medium M is implemented by the control section 20 by controlling sections in accordance with programs stored in a storage device. These programs can also be presented as programs stored in an information storage medium that can be read by a variety of computers.

Figure 3:
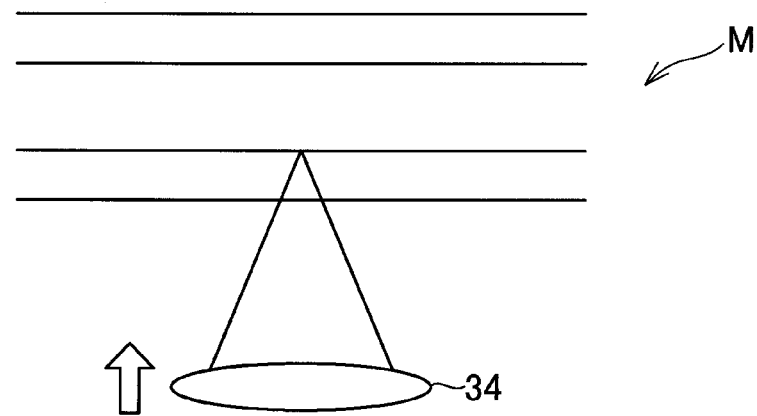
FIG. 3 is a diagram showing a model of a movement of an object lens in a sweep operation.

First of all, in the same way as the existing optical disc apparatus, the control section 20 measures the distance L from the medium surface of the optical disc medium M to the signal surface in order to determine the type of the optical disc medium M. To put it more concretely, while letting the second light emitting device 32 radiate small-waveform light, the control section 20 controls the object-lens driving section 36 so that the object lens 34 moves in the focus direction at a constant speed. The focus direction of the movement can be a direction in which the object lens 34 approaches the medium surface of the optical disc medium M or a direction in which the object lens 34 departs from the medium surface of the optical disc medium M. In this case, let the focus direction of the movement be a direction in which the object lens 34 approaches the medium surface of the optical disc medium M. In the following description, the operation to move the object lens 34 in the direction to the optical disc medium M at a constant speed in this way is referred to as a sweep operation. FIG. 3 is a diagram showing a model of a movement of the object lens 34 with respect to the optical disc medium M in a sweep operation.

In a sweep operation, the focal point of the object lens 34 passes through the medium surface of the optical disc medium M and the signal surface for every degree. At that time, a peak appears on a PI signal due to light reflected from the optical disc medium M. In the following description, the type determination processing using small-wavelength light is referred to as primary type determination processing.

Figure 4:
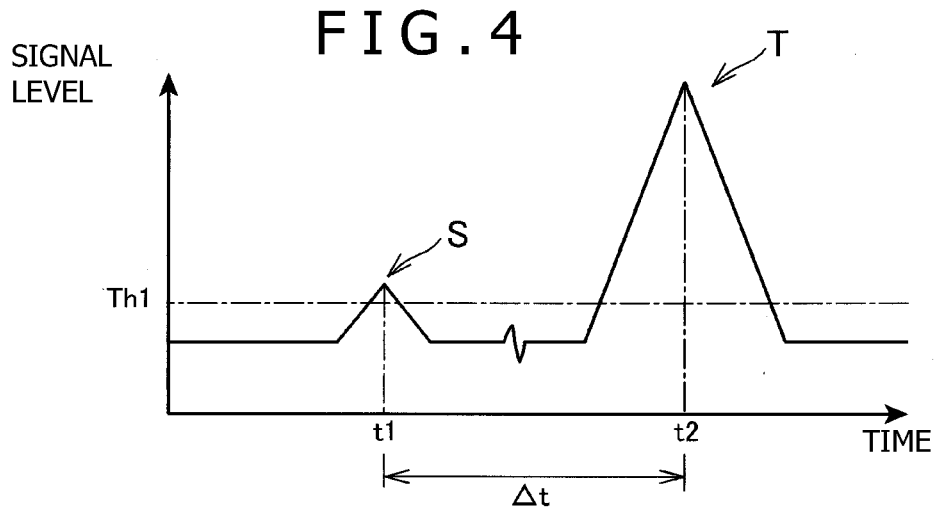
FIG. 4 is a diagram showing a typical PI signal waveform obtained by carrying out a sweep operation using small-wavelength light.

FIG. 4 is a diagram showing a typical PI signal waveform obtained by carrying out a sweep operation while outputting small-wavelength light (the waveform of the PI signal represents changes of the PI signal along the time axis). As shown in FIG. 4, two peaks appear on the PI signal. The two peaks are a medium-surface reflection signal S and a signal-surface reflection signal T. The medium-surface reflection signal S is caused by reflection on the medium surface whereas the signal-surface reflection signal T is caused by reflection on the signal surface. Notation Th1 shown in the figure denotes a threshold value for peak detection (in the following description, the threshold value for peak detection is referred to as a threshold value Th1). The respective PI-signal peaks exceeding the threshold value Th1 are detected as the medium-surface reflection signal S and the signal-surface reflection signal T. In a sweep operation, the object lens 34 is approaching the optical disc medium M at a constant speed. Thus, the time interval Δt between a detection timing t1 of the medium-surface reflection signal S and a detection timing t2 of the signal-surface reflection signal T corresponds to a distance L between the medium surface of the optical disc medium M and the signal surface. If the distance L can be computed, the type of the optical disc medium M can be determined. It is to be noted that, in the primary type determination processing, small-wavelength light is used in place of large-wavelength light. This is because, if large-wavelength light is used, the focal-point distance becomes longer so that, in the case of a BD having a short distance L, the medium-surface reflection signal S and the signal-surface reflection signal T can no longer be detected independently of each other.

If the optical disc apparatus 1 is used for a long period of time, dirt of the air, cigarette tars and the like are stuck to the optical system 33 of the optical pickup 13, causing the light transmission factor to decrease. As a result, there is generated a phenomenon in which the level of a signal detected by the focus detector 35 decreases. As a result of research, inventors of the present technology have discovered the fact that the signal level much decreases particularly if small-wavelength light is used. When such a phenomenon occurs, the peak level of the medium-surface reflection signal S undesirably becomes lower than the threshold value Th1 so that, in some cases, the medium-surface reflection signal S cannot be detected. In order to solve this problem, in the case of this embodiment, if the medium-surface reflection signal S cannot be detected in the primary detection processing described above, type determination processing using large-waveform light is carried out. In the following description, the type determination processing using large-waveform light is referred to as secondary type determination processing.

Figure 5:
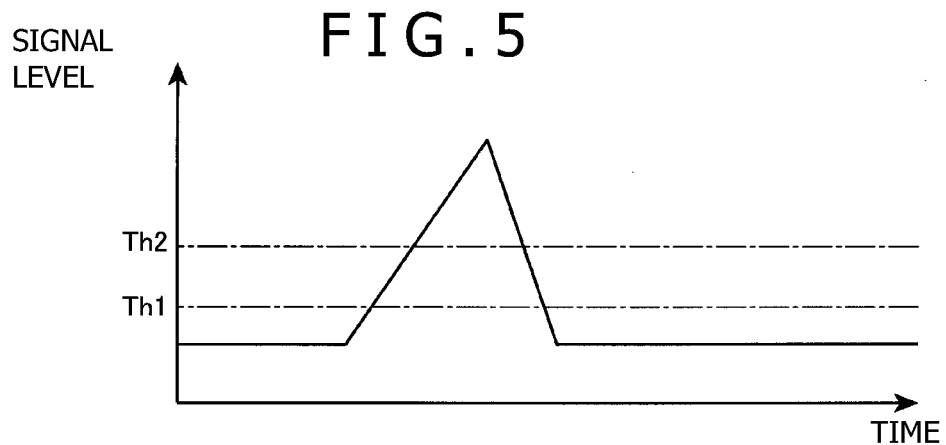
FIG. 5 is a diagram showing a typical PI signal waveform obtained by carrying out a sweep operation using large-wavelength light on a BD.

As described above, in a sweep operation carried out on a BD by using large-wavelength light, since the distance L of the BD is comparatively short, the medium-surface reflection signal S and the signal-surface reflection signal T are not separated from each other but are detected as one peak. FIG. 5 is a diagram showing a typical PI signal waveform obtained by carrying out a sweep operation using large-wavelength light on a BD. If only one peak is detected in a sweep operation using large-wavelength light as shown in the figure, the optical disc medium M is determined to be a BD. It is to be noted that the control section 20 can be used as a section configured to determine the type of the optical disc medium M on the basis of not only the number of peaks, but also the signal level of the detected peak. To put it more concretely, if the first detected peak level is higher than a BD determination threshold value Th2 predetermined for the BD, the control section 20 may determine that the optical disc medium M is a BD. In this case, the BD determination threshold value Th2 predetermined for the BD is set at a value obtained by multiplying the expected peak level of the medium-surface reflection signal S by a predetermined coefficient of typically 1.5 so that a peak appearing solely as the medium-surface reflection signal S is not mistakenly determined to be a peak caused by a signal-surface reflection signal T. The BD determination threshold value Th2 predetermined for the BD can be set at the shipping time of the optical disc apparatus 1.

Figure 6:
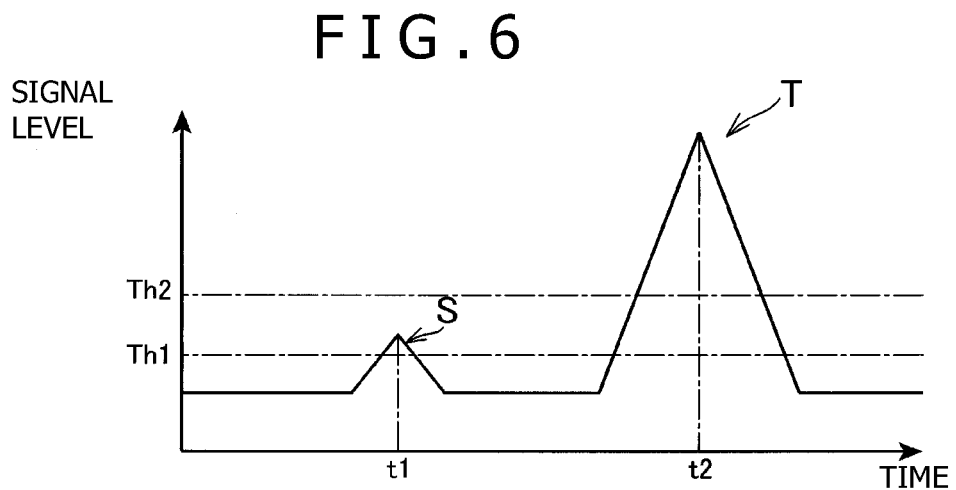
FIG. 6 is a diagram showing a typical PI signal waveform obtained by carrying out a sweep operation using large-wavelength light on a CD.

Reversely, if the medium-surface reflection signal S and the signal-surface reflection signal T can be detected independently of each other in secondary type determination processing, the control section 20 determines that the optical disc medium M is not a BD. FIG. 6 is a diagram showing a typical PI signal waveform obtained by carrying out a sweep operation using large-wavelength light on a CD. If peaks caused by the medium-surface reflection signal S and the signal-surface reflection signal T are both detected as shown in the figure, the control section 20 determines that the optical disc medium M is not a BD. To put it more concretely, if the first detected peak level is not higher than a BD determination threshold value Th2 predetermined for the BD, the control section 20 may determine that the peak is a peak caused by a medium-surface reflection signal S and the optical disc medium M is not a BD. Furthermore, in this case, in the same way as the first type determination processing, the type of the optical disc medium M can be determined on the basis of the detection timing t1 of the medium-surface reflection signal S and the detection timing t2 of the signal-surface reflection signal T. In particular, if the optical disc apparatus 1 according to this embodiment is provided not only for CDs and BDs, but also for DVDs and others, in the case of an optical disc medium M other than a BD, the control section 20 may determine the type of the optical disc medium M on the basis of the detection timing t1 of the medium-surface reflection signal S and the detection timing t2 of the signal-surface reflection signal T. It is to be noted that, as described earlier, if the optical disc apparatus 1 is used for a long period of time, the signal level decreases particularly in an operation using light radiated at a small wavelength. Thus, in primary type determination processing using small-wavelength light, even if the medium-surface reflection signal S cannot be detected, it is expected that, in secondary type determination processing, the medium-surface reflection signal S is detected.

As described above, first of all, primary type determination processing is carried out by using small-wavelength light. Then, if the type of the optical disc medium M cannot be determined in the primary type determination processing, secondary type determination processing is carried out by using large-wavelength light. However, the type determination is not limited to this processing sequence. That is to say, from the beginning, the optical disc apparatus 1 may carry out the secondary type determination processing in order to determine the type of an optical disc medium M.

Figure 7:
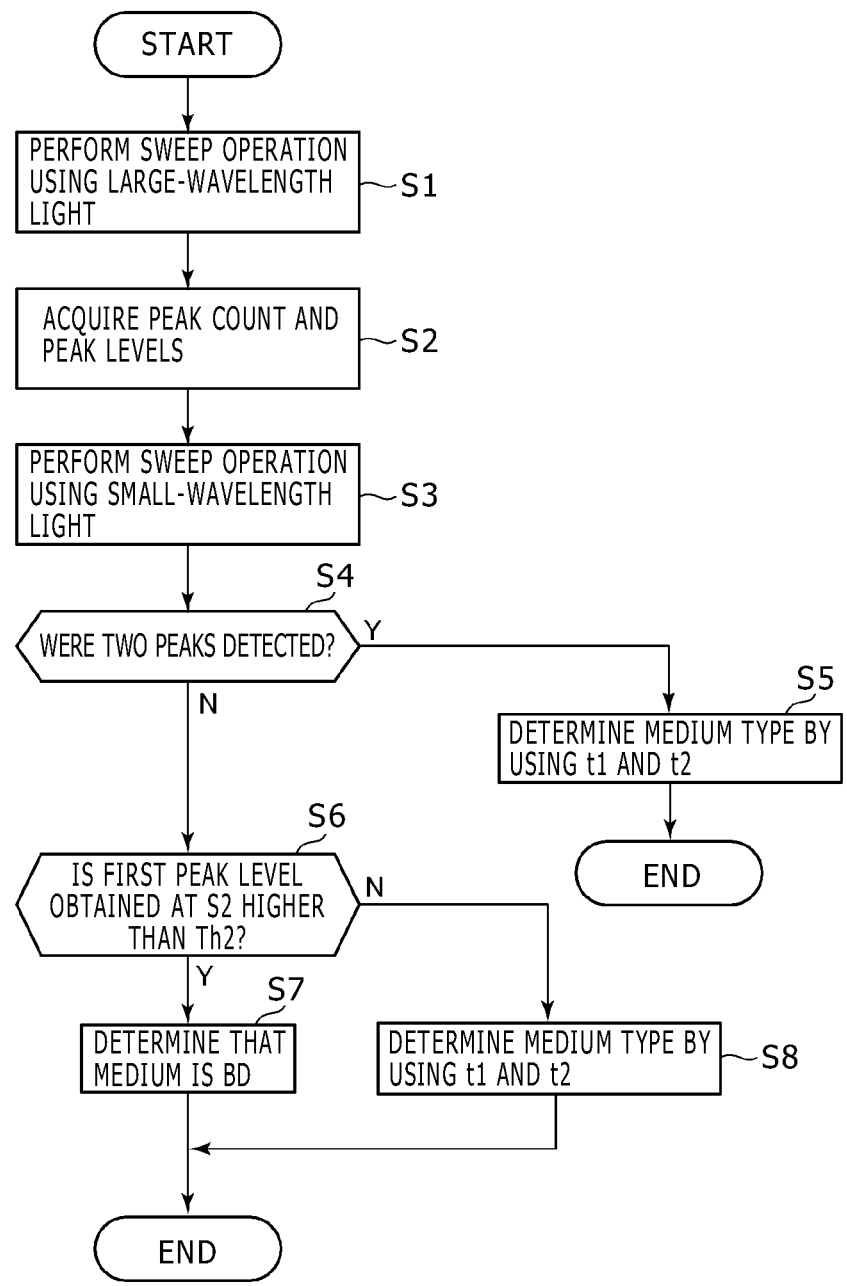
FIG. 7 is a flowchart showing flows of type determination processing carried out by the optical disc apparatus according to an embodiment of the present technology.

In addition, even if the primary type determination processing and the secondary type determination processing are carried out as type determination processing itself in the order described above, the order to acquire the PI-signal waveforms to be used in the type determination may be opposite to the order in which the primary type determination processing and the secondary type determination processing are carried out. An implementation procedure of the processing to determine the type of an optical disc medium M in this case is explained below by referring to FIG. 7.

There may be a case in which existence of some substances on the optical pickup 13 is detected by a sensor (shown in none of the figures). In addition, there may be a case in which the medium support section 11 infers the fact that some media is newly set in the medium support section 11. This is because, when some media is newly set in the medium support section 11, the disc tray is opened and then closed. In such cases, the control section 20 determines whether or not the newly set optical disc medium M is a medium provided for the optical disc apparatus 1 according to the embodiment by carrying out processing starting with a step S1 at which a sweep operation is performed by using large-wavelength light. Then, at a step S2, the control section 20 obtains information on the number of peaks appearing in the waveform of a PI signal and peak levels during the sweep operation.

Then, the control section 20 carries out primary type determination processing. To put it more concretely, at a step S3, the control section 20 carries out a sweep operation by radiating small-waveform light. Then, the flow of the type determination processing goes on to a step S4 to determine whether or not two respective peaks of the medium-surface reflection signal S and the signal-surface reflection signal T have been detected. If both the medium-surface reflection signal S and the signal-surface reflection signal T have been detected, the flow of the type determination processing goes on to a step S5 at which the control section 20 determines the type of the optical disc medium M on the basis of the detection timings t1 and t2 of the medium-surface reflection signal S and the signal-surface reflection signal T.

If the result of the determination carried out at the step S4 indicates that only one peak was detected, on the other hand, the control section 20 carries out secondary type determination processing by using the information obtained at the step S2. To put it more concretely, at a step S6, the control section 20 determines whether or not the level of the first detected peak is higher than the BD determination threshold value Th2. If the result of the determination indicates that the level of the first detected peak is higher than the BD determination threshold value Th2, the flow of the type determination processing goes on to a step S7 at which the control section 20 determines that the optical disc medium M is a BD. Then, the type determination processing is ended. If the result of the determination indicates that the level of the first detected peak is not higher than the BD determination threshold value Th2, on the other hand, the flow of the type determination processing goes on to a step S8 at which the control section 20 determines the type of the optical disc medium M on the basis of the detection timings t1 and t2 of the two peaks obtained at the step S2 in the same way as the step S5.

In accordance with the type determination processing provided by the embodiment as described above, on the basis of the number of peaks detected in a sweep operation carried out by using large-wavelength light for originally an optical disc medium M other than the BD, the optical disc medium M is determined to be a BD or not a BD. Thus, even if the optical disc apparatus 1 is used for a long period of time so that the signal level decreases, the type of an optical disc medium M can be determined without amplifying signals and reducing the threshold value.

Signal Quality Deterioration Countermeasures in Information Reading Operations

The following description explains countermeasures taken by the optical disc apparatus 1 according to the embodiment in operations to read out information from the optical disc medium M as countermeasures against deteriorations of a signal quality.

Figure 8A:
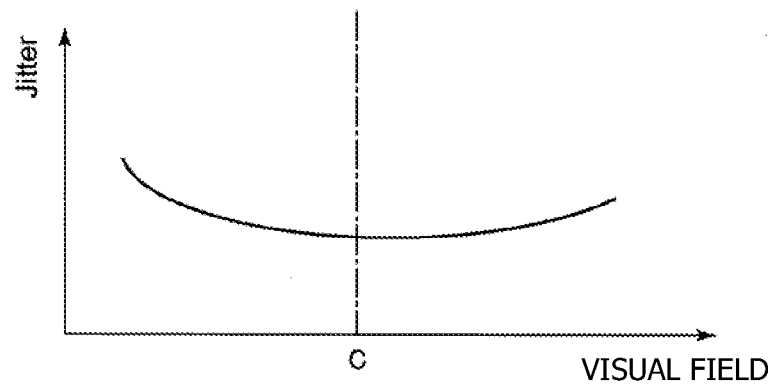
FIG. 8A is a diagram showing a visual field vs. jitter characteristic with a signal quality not deteriorating.
Figure 8B:
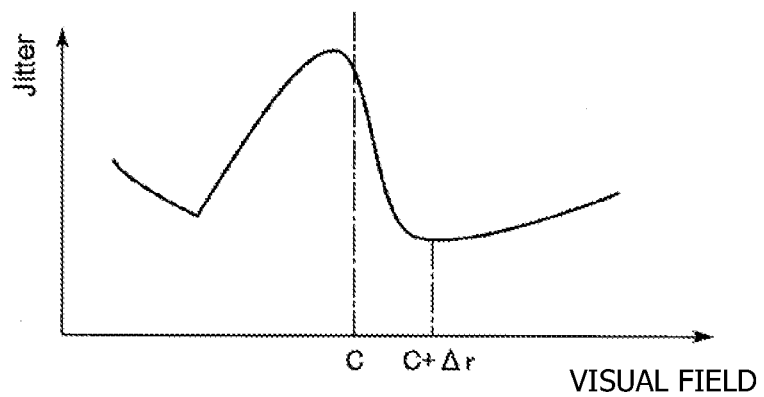
FIG. 8B is a diagram showing a visual field vs. jitter characteristic with a signal quality deteriorating.

As described before, when the optical disc apparatus 1 is used for a long period of time, the signal deteriorates in particular if small-wavelength light is radiated. Thus, in an operation to read out information from the optical disc medium M, the signal level decreases so that a read error is generated in some cases. As a result of research, inventors of the present technology have discovered the fact that the effect of the signal-quality deterioration increases in the optical-axis vicinity where the strength of the radiated light is particularly large. FIGS. 8A and 8B are each a diagram referred to in explanation of deteriorations of the signal quality. In each of the diagrams, the horizontal axis represents a visual field along the tracking direction of the optical system 33 whereas the vertical axis represents the jitter value obtained in an operation to read out information from the optical disc medium M at the position. To be more specific, FIG. 8A is a diagram showing a visual field vs. jitter characteristic with a signal quality not deteriorating whereas FIG. 8B is a diagram showing a visual field vs. jitter characteristic with a signal quality deteriorating because of the usage for a long period of time. It is to be noted that an alternate long and short line shown in each of FIGS. 8A and 8B represents center positions of an optical flux radiated from the optical system 33. In the following description, the center positions of an optical flux radiated from the optical system 33 are referred to as an optical-axis position C.

As shown in FIG. 8A, in a state at an initial-shipping time, at the optical-axis position C, the jitter value is lowest. This indicates that the quality of an operation to read out information by adjusting the position of the object lens 34 to the optical-axis position C is the highest quality. When the signal quality deteriorates, on the other hand, as shown in FIG. 8B, it is obvious that its effect appears most strikingly in the vicinity of the optical-axis position C but there is no remarkable effect on areas shifted from the optical-axis position C. Thus, in the event of a read error caused by deterioration of the signal quality during an operation to read out information from a BD by using small-wavelength light, the optical disc apparatus 1 according to the embodiment deliberately shifts the relative position in a tracking direction between the optical axis and the object lens 34 so that the deterioration of the signal quality hardly has an effect. In the following description, this control is referred to as optical-axis shift control.

Figure 9A:
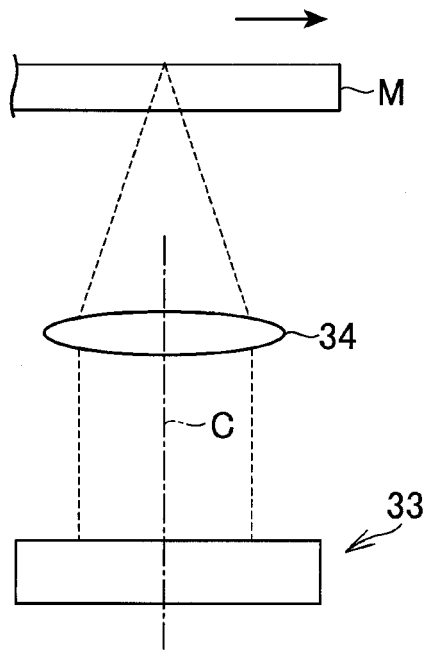
FIG. 9A is a diagram showing a relative positional relation between an optical system and an object lens in a normal condition.
Figure 9B:
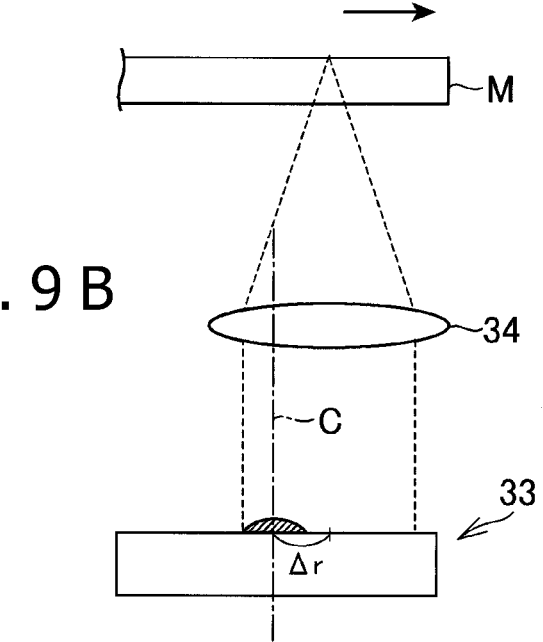
FIG. 9B is a diagram showing a relative positional relation between an optical system and an object lens under optical-axis shift control.

FIGS. 9A and 9B are each a diagram showing a relative positional relation between the optical system 33 and the object lens 34. FIG. 9A is a diagram showing a typical positional relation at a normal time. In this case, the center of the object lens 34 coincides with the optical-axis position C. FIG. 9B is a diagram showing a positional relation between the optical system 33 and the object lens 34 under the optical-axis shift control. In this case, the object-lens driving section 36 shifts the object lens 34 in the tracking direction to the outer circumference of the optical disc medium M by $\Delta r$. As a result, the read position of information is shifted from the optical-axis position C of the optical system 33 by $\Delta r$ (the read position of information is the focal-point position of the object lens 34). Thus, a read operation is carried out at a position (C+$\Delta r$) shown in FIG. 8B so that the deterioration of the signal quality can be reduced. In this case, the object lens 34 is shifted to the outer-circumference side of the optical disc medium M. It is to be noted, however, that the object lens 34 can also be shifted to the inner-circumference side of the optical disc medium M. In addition, in this case, the movement distance of the object lens 34 has a large value in comparison with a range in which the object lens 34 is moved at an execution time of tracking servo control. It is desirable to set the movement distance at a typical value of at least ±0.1 mm.

It is to be noted that, if the position of the object lens 34 relative to the optical system 33 is shifted as described above, the position of reflected light (spot) coming from the optical disc medium M as light incident to the focus detector 35 is also shifted from the center of the focus detector 35. However, such a spot position shift may be made unintentionally. In this case, a technology for correcting the TE signal has been made available. The TE signal is corrected so that the TE signal correctly represents the shift between the focal-point position of the object lens 34 and a track position of the optical disc medium M. By applying such a technology, even if the position of the object lens 34 is shifted intentionally in the tracking direction to the optical-axis position C in accordance with the optical-axis shift control, it is possible to obtain a TE signal with a cancelled effect of the position shift.

In general, as shown in FIG. 8A, the optical pickup 13 is designed so that the read quality is best when an operation to read out information at the optical-axis position C is carried out. Thus, if the position of the object lens 34 relative to the optical system 33 is shifted unconditionally, an undesired read quality deterioration is generated. In order to solve this problem, only if a specific condition is satisfied, does the optical disc apparatus 1 according to this embodiment carry out the optical-axis shift control described above. To put it more concretely, in processing carried out to determine the type of an optical disc medium, when the level of a signal obtained from the optical disc medium is determined to be not sufficient, the optical-axis shift control is carried out. The following description explains a concrete example of optical-axis shift control carried out by the optical disc apparatus 1 according to the embodiment. The control is explained by referring to FIG. 10. Much like the type determination processing, the optical-axis shift control is implemented by the control section 20 by controlling sections in accordance with programs stored in a storage device. These programs can also be presented as programs stored in an information storage medium that can be read by a variety of computers.

When the control section 20 receives an instruction from the host as an instruction to read out information, first of all, at a step S11, the control section 20 starts an operation to read out the information with the object lens 34 put at a reference position. The reference position is a position at which the object lens 34 coincides with the optical-axis position C as shown in FIG. 9A at a tracking servo start time.

While a reading operation is being carried out normally in this state, it is not necessary to execute the optical-axis shift control. Assume that a decrease of the signal level causes an uncorrectable read error at a step S12. In this case, the control section 20 determines whether or not the optical-axis shift control is to be carried out. To put it more concretely, at a step S13, the control section 20 determines whether or not it was possible to determine the type of the optical disc medium M by carrying out only primary type determination processing using small-wavelength light when performing the type determination processing described above on the optical disc medium M being read, or it was possible to determine the type of the optical disc medium M by carrying out the primary type determination processing and also secondary type determination processing to determine whether or not the optical disc medium M is a BD. A flag is stored in the storage device employed in the control section 20. The flag indicates whether or not (in order to perform such type determination) it was possible to determine the type of the optical disc medium M by carrying out also the secondary type determination processing when performing the type determination processing described above on the optical disc medium M. The control section 20 refers to the stored flag in determining whether or not the secondary type determination processing has also been carried out.

If it was possible to determine the type of the optical disc medium M by carrying out only the primary type determination processing, the control section 20 infers that the signal level has not decreased. In this case, the flow of the control goes on to a step S14 to carry out error processing in the same way as the existing method. Typically, the control section 20 stops the read operation. If it was possible to determine whether or not the optical disc medium M is a BD by carrying out also the secondary type determination processing, on the other hand, the optical-axis shift control is carried out. To put it more concretely, at a step S15, the control section 20 moves the position of the object lens 34 in the tracking direction from the reference position by a predetermined distance +$\Delta r$. It is to be noted that the movement direction of the object lens 34 is the direction toward the outermost circumference of the optical disc medium M. As a result, the object lens 34 and the optical system 33 are put in a positional relation like one shown in FIG. 9B.

If the read operation is successful in this state, the flow of the control goes on to a step S16 to continue the read operation as it is. If another read error is generated, on the other hand, the flow of the control goes on to a step S17. This time, at this step, the control section 20 moves the position of the object lens 34 in the tracking direction by a predetermined distance −Δr from the reference position. That is to say, the control section 20 moves the position of the object lens 34 in a direction opposite to the direction of the movement made at the step S15 by the same distance (that is to say, the control section 20 moves the position of the object lens 34 in a direction to the center of the optical disc medium M). If the read operation is successful in this state, the flow of the control goes on to the step S16 to continue the read operation as it is. Should the read operation fail even if the object lens 34 has been moved in the opposite direction, the flow of the control goes on to a step S14 to carry out error processing in the same way as the existing method.

When the optical disc medium M is removed from the optical disc apparatus 1 at the end of the read operation, the control section 20 restores the position of the object lens 34 described above to the reference position. This is because, depending on the type of the optical disc medium M, the read operation may be successful in some cases and, as long as the read operation is successful, it is not necessary to carry out the optical-axis shift control.

It is to be noted that, when the optical disc apparatus 1 according to the embodiment is reading out information from the optical disc medium M, the tracking-direction position of the object lens 34 is determined by two parameters which are an offset value of tracking servo control and a parameter representing the position of the optical system 33 relative to the optical-axis position C. The offset value of the tracking servo control is always set at 0 regardless of the optical-axis shift control described before. Thus, in the same way as the existing optical disc apparatus, in execution of the tracking servo control, the focal-point position of the object lens 34 is controlled to follow a track position of the optical disc medium M. In accordance with the optical-axis shift control, only the position of the object lens 34 relative to the optical-axis position C of the optical system 33 is changed in the disc outer-circumference direction or the disc inner-circumference direction with respect to the reference position.

In accordance with the optical disc apparatus 1 according to the embodiment described above, when a read error is generated by a decrease of the signal level, the position of the object lens 34 relative to the optical axis of the optical system 33 is shifted so that continuation of the read operation avoiding the place of the generated decrease of the signal level can be expected.

The above description has explained the optical-axis shift control which is carried out only if an operation is performed to read out information from a BD. Also keep in mind, however, that it is quite within the bounds of possibility that the same effect is obtained also when an operation is performed to read out information from an optical disc medium M which is not a BD. For example, the same effect is obtained when a portion of the optical system 33 and/or the object lens 34 are shared in an operation radiating small-wavelength light for a BD and other light having a relatively large wavelength. Thus, the optical disc apparatus 1 may carry out similar optical-axis shift control also when reading out information from an optical disc medium M of another type. In addition, the above description has explained a case in which the object lens 34 is moved only at one stage also when shifting the object lens 34 in the outer-circumference or inner-circumference direction of the optical disc medium M. If a read error is generated even by a one-stage shift, however, the object lens 34 can be further moved along a longer distance.

In addition, according to the above description, the optical disc apparatus 1 determines whether or not to carry out the optical-axis shift control in accordance with whether or not the secondary type determination processing has been performed in the processing to determine the type of the optical disc medium M. However, the type determination processing is not limited to this technique. For example, the optical disc apparatus 1 may carry out the optical-axis shift control unconditionally in the event of a generated read error. As an alternative, the optical disc apparatus 1 may determine whether or not to carry out the optical-axis shift control on the basis of various kinds of data measured in initial processing performed when an optical disc medium M is newly set. For example, the optical disc apparatus 1 may determine whether or not to carry out the optical-axis shift control on the basis of various kinds of data measured in processing to determine the type of the optical disc medium M. To put it more concretely, for example, the optical disc apparatus 1 may carry out the optical-axis shift control when the peak levels of the medium-surface reflection signal S and/or the signal-surface reflection signal T are not higher than a threshold value determined in advance. The peak levels of the medium-surface reflection signal S and/or the signal-surface reflection signal T are peak levels measured in the initial processing.

As described above, the optical system 33 and the object lens 34 are shared by type determinations using large-waveform light and small-waveform light. It is to be noted, however, that the optical system 33 and the object lens 34 which are provided for large-waveform light may be different from respectively the optical system 33 and the object lens 34 which are provided for small-waveform light.

In the above description, the optical disc apparatus 1 is an apparatus for reading out information from a CD or a BD. In addition to a CD and a BD, the optical disc apparatus 1 can also be an apparatus for reading out information from another optical disc medium M such as a DVD. In either case, the type of a disk is determined by using relatively-large-wavelength light not proper for the existing operation to detect the medium-surface reflection signal S and the signal-surface reflection signal T independently of each other. Initially, if the signal-surface reflection signal T is detected, the optical disc medium M is determined to be a disc of a type for light having a small wavelength. Thus, also if the medium-surface reflection signal S cannot be detected by using light having a small wavelength, it is possible to identify an optical disc medium M of a type for small wavelengths.

The present technology contains subject matter related to that disclosed in Japanese Priority Patent Application JP 2013-232291 filed in the Japan Patent Office on Nov. 8, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus capable of reading out information stored in an optical disc medium of a first type and another optical disc medium of a second type, said optical disc apparatus comprising:
   an optical pickup radiating
   light having a first wavelength provided for said optical disc medium of said first type and
   light having a second wavelength which is smaller than said first wavelength and provided for said optical disc medium of said second type;

a signal outputting section outputting an output signal according to reflected light obtained as a result of reflection on said optical disc medium of light radiated by said optical pickup; and a type determination section requesting said optical pickup to radiate light having said first wavelength to an object optical disc medium serving as an object of type determination to acquire an output signal output by said signal outputting section and determining the type of said object optical disc medium based on the number of detected peaks appearing in said acquired output signal output by said signal outputting section while moving said optical pickup in a direction to said object optical disc medium;

wherein while moving said optical pickup in a direction approaching said object optical disc medium, said type determination section requests said optical pickup to radiate light having said first wavelength to said object optical disc medium to acquire an output signal output by said signal outputting section and determines the type of optical disc medium based on comparing a peak initially appearing in said acquired output signal to a first predetermined threshold value and a second predetermined threshold value, the second predetermined threshold value being substantially greater than the first predetermined threshold value.

2. The optical disc apparatus according to claim 1 wherein, while moving said optical pickup in a direction approaching said object optical disc medium, said type determination section requests said optical pickup to radiate light having said first wavelength to said object optical disc medium to acquire an output signal output by said signal outputting section and determines that said object optical disc medium is an optical disc medium of said second type if a peak initially appearing in said acquired output signal is equal to or greater than a predetermined threshold value.

3. The optical disc apparatus according to claim 1 wherein, while moving said optical pickup in a direction to said object optical disc medium, said type determination section requests said optical pickup to radiate light having said second wavelength to said object optical disc medium to acquire an output signal output by said signal outputting section; and if two reflected signals, which include
a reflected signal reflected by a medium surface of said object optical disc medium and
a reflected signal reflected by a signal surface of said object optical disc medium,
can be detected from said acquired output signal, said type determination section determines the type of said object optical disc medium on the basis of said two reflected signals, or if said two reflected signals cannot be detected from said acquired output signal, said type determination section determines the type of said object optical disc medium on the basis of the number of peaks appearing on an output signal acquired by said type determination section by radiating light having said first wavelength.

4. The optical disc apparatus according to claim 1, wherein determining the type of said object optical disc medium based on the number of detected peaks includes determining the type of said object optical disc medium based on whether two peaks are detected or only one peak is detected.

5. The optical disc apparatus according to claim 4, wherein determining the type of said object optical disc medium based on the number of detected peaks includes determining that the type of said object optical disc medium is the first type, based on the detection of two peaks.

6. The optical disc apparatus according to claim 4, wherein determining the type of said object optical disc medium based on the number of detected peaks includes determining that the type of said object optical disc medium is the second type, based on the detection of only one peak.

7. The optical disc apparatus according to claim 1, wherein determining the type of optical disc medium based on comparing a peak initially appearing in said acquired output signal to a first predetermined threshold value and a second predetermined threshold value includes determining that the initially appearing peak is equal to or greater than the first predetermined threshold value and less than the second predetermined threshold value.

8. The optical disc apparatus according to claim 1, wherein determining the type of optical disc medium based on comparing a peak initially appearing in said acquired output signal to a first predetermined threshold value and a second predetermined threshold value includes determining that the initially appearing peak is equal to or greater than the second predetermined threshold value.

9. A control method of an optical disc apparatus which is capable of reading out information stored in an optical disc medium of a first type and another optical disc medium of a second type and includes an optical pickup radiating light having a first wavelength provided for said optical disc medium of said first type and light having a second wavelength which is smaller than said first wavelength and provided for said optical disc medium of said second type; and a signal outputting section outputting an output signal according to reflected light obtained as a result of reflection on said optical disc medium of light radiated by said optical pickup, said method comprising:
requesting said optical pickup to radiate light having said first wavelength to an object optical disc medium serving as an object of type determination to acquire an output signal output by said signal outputting section while moving said optical pickup in a direction to said object optical disc medium; and determining the type of said object optical disc medium based on the number of detected peaks appearing in said acquired output signal;

wherein said method comprises, while moving said optical pickup in a direction approaching said object optical disc medium, requesting said optical pickup to radiate light having said first wavelength to said object optical disc medium to acquire an output signal output by said signal outputting section and determining the type of optical disc medium based on comparing a peak initially appearing in said acquired output signal to a first predetermined threshold value and a second predetermined threshold value, the second predetermined threshold value being substantially greater than the first predetermined threshold value.

10. A microprocessor operating under the control of an executable program for controlling an optical disc apparatus which is capable of reading out information stored in an optical disc medium of a first type and another optical disc medium of a second type and includes an optical pickup radiating light having a first wavelength provided for said optical disc medium of said first type and light having a second wavelength which is smaller than said first wavelength and provided for said optical disc medium of said second type; and a signal outputting section outputting an output signal according to reflected light obtained as a result of reflection on said optical disc medium of light radiated by said optical pickup, said program for a computer comprising:

requesting said optical pickup to radiate light having said first wavelength to an object optical disc medium serving as an object of type determination to acquire an output signal output by said signal outputting section while moving said optical pickup in a direction to said object optical disc medium; and determining the type of said object optical disc medium based on the number of detected peaks appearing in said acquired output signal;

wherein said program comprises, while moving said optical pickup in a direction approaching said object optical disc medium, requesting said optical pickup to radiate light having said first wavelength to said object optical disc medium to acquire an output signal output by said signal outputting section and determining the type of optical disc medium based on comparing a peak initially appearing in said acquired output signal to a first predetermined threshold value and a second predetermined threshold value, the second predetermined threshold value being substantially greater than the first predetermined threshold value.

11. A non-transitory information storage medium which can be read by a computer and is used for storing a program for controlling an optical disc apparatus which is capable of reading out information stored in an optical disc medium of a first type and another optical disc medium of a second type and includes an optical pickup radiating light having a first wavelength provided for said optical disc medium of said first type and light having a second wavelength which is smaller than said first wavelength and provided for said optical disc medium of said second type; and a signal outputting section outputting an output signal according to reflected light obtained as a result of reflection on said optical disc medium of light radiated by said optical pickup, said program for the computer comprising:

requesting said optical pickup to radiate light having said first wavelength to an object optical disc medium serving as an object of type determination to acquire an output signal output by said signal outputting section while moving said optical pickup in a direction to said object optical disc medium; and determining the type of said object optical disc medium based on the number of detected peaks appearing in said acquired output signal;

wherein said program comprises, while moving said optical pickup in a direction approaching said object optical disc medium, requesting said optical pickup to radiate light having said first wavelength to said object optical disc medium to acquire an output signal output by said signal outputting section and determining the type of optical disc medium based on comparing a peak initially appearing in said acquired output signal to a first predetermined threshold value and a second predetermined threshold value, the second predetermined threshold value being substantially greater than the first predetermined threshold value.

* * * * *